(12) United States Patent
An et al.

(10) Patent No.: US 10,704,819 B2
(45) Date of Patent: Jul. 7, 2020

(54) POWDERED ICE MAKER

(71) Applicant: LG Electronics Inc., Seoul (KR)

(72) Inventors: Kwangyong An, Seoul (KR); Jaehyun Han, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 16/066,262

(22) PCT Filed: Dec. 27, 2016

(86) PCT No.: PCT/KR2016/015314
§ 371 (c)(1),
(2) Date: Jun. 26, 2018

(87) PCT Pub. No.: WO2017/116111
PCT Pub. Date: Jul. 6, 2017

(65) Prior Publication Data
US 2019/0011165 A1    Jan. 10, 2019

(30) Foreign Application Priority Data

Dec. 29, 2015  (KR) .......................... 10-2015-0188320

(51) Int. Cl.
*F25C 1/10*         (2006.01)
*F25C 1/14*         (2018.01)
(Continued)

(52) U.S. Cl.
CPC .................. *F25C 1/14* (2013.01); *F25C 1/10* (2013.01); *F25C 1/145* (2013.01); *F25C 5/18* (2013.01);
(Continued)

(58) Field of Classification Search
CPC . A23G 9/12; A23G 9/22; A23G 9/224; A23G 9/228; A23G 9/281; F25C 1/147;
(Continued)

(56) References Cited

U.S. PATENT DOCUMENTS

| 3,159,986 A * | 12/1964 | King ......................... F25C 1/14 |
| | | 62/354 |
| 2004/0261442 A1 | 12/2004 | Chung et al. |
| 2012/0124836 A1* | 5/2012 | Burn .......................... F25C 1/14 |
| | | 29/890.035 |

FOREIGN PATENT DOCUMENTS

| KR | 2019950006397 | 8/1995 |
| KR | 2019950006397 Y * | 8/1995 |

(Continued)

OTHER PUBLICATIONS

International Search Report in International Application no. PCT/KR2016/015314, dated Apr. 3, 2017, 28 pages.

*Primary Examiner* — Frantz F Jules
*Assistant Examiner* — Lionel Nouketcha
(74) *Attorney, Agent, or Firm* — Fish & Richardson P.C.

(57) ABSTRACT

The present invention relates to a powdered ice maker comprising: an ice-making part provided in a cylinder shape of which the inside is empty; a rotary shaft rotating around the central axis of the ice-making part; a water spraying part provided at the rotary shaft so as to spray water at an inner wall of the ice-making part while rotating; a cutter part provided at the rotary shaft so as to cut the ice formed on the inner wall of the ice-making part while rotating; a water tray rotating at the same angular velocity as that of the rotary shaft, and provided at a lower side of the water spraying part; and an ice tray provided at a lower side of the cutter part.

20 Claims, 10 Drawing Sheets

(51) Int. Cl.
  *F25C 5/18* (2018.01)
  *F25C 1/145* (2018.01)
  F25C 1/147 (2018.01)
  A23G 9/12 (2006.01)
  A23G 9/22 (2006.01)
  F25C 5/02 (2006.01)
  A23G 9/28 (2006.01)

(52) U.S. Cl.
  CPC .................. *A23G 9/12* (2013.01); *A23G 9/22* (2013.01); *A23G 9/224* (2013.01); *A23G 9/228* (2013.01); *A23G 9/281* (2013.01); *F25C 1/147* (2013.01); *F25C 5/02* (2013.01); *F25C 2400/14* (2013.01); *F25C 2500/02* (2013.01); *F25C 2500/06* (2013.01); *F25C 2700/10* (2013.01)

(58) Field of Classification Search
  CPC .......... F25C 5/02; F25C 2700/10; F25C 1/14; F25C 5/18
  See application file for complete search history.

(56) References Cited

FOREIGN PATENT DOCUMENTS

| KR | 101446901 | 10/2014 |
|---|---|---|
| KR | 101512665 | 4/2015 |
| KR | 1020150131859 | 6/2016 |

\* cited by examiner

POWDERED ICE MAKER

CROSS-REFERENCE TO RELATED APPLICATIONS

This application is a National Stage application under 35 U.S.C. § 371 of International Application No. PCT/KR2016/015314, filed on Dec. 27, 2016, which claims the benefit of Korean Application No. 10-2015-0188320, filed on Dec. 29, 2015. The disclosures of the prior applications are incorporated by reference in their entirety.

FIELD

Embodiments of the present disclosure relate to a powdered ice maker.

BACKGROUND

A powdered or shaved ice maker means an electric device configured to make shaved ice flakes looking like snow. Different from ice cube, snow shaved ice has advantages of a short making time and a high heat exchange efficiency.

Such a powdered or shaved ice maker may be classified into a rotary ice-making drum type and a fixed ice-making drum type.

A conventional rotary ice-making drum type powdered ice maker is disclosed in Korean Patent No. 10-0809928 which includes a rotary ice-making drum, a refrigeration cycle for cooling the ice-making drum, a water tank with water in which the ice-making drum is partially submerged, and a cutting blade for cutting the ice stuck on an outer circumferential surface of the ice-making drum into shaved ice.

Meanwhile, the conventional fixed ice-making drum type powdered ice maker is disclosed in Korean Patent No. 10-1446901 which includes a fixed ice-making drum having a freezing system, a water spray unit configured to spray water to an inner wall of the ice-making drum while rotating in the ice-making drum, and a cutter unit configured to make shaved ice by cutting the ice made from the sprayed water.

The rotary ice-making drum type powdered ice maker has a rotatable ice-making drum such that the refrigerant supplied to an evaporator provided in the ice-making drum might leak. The loading condition of the compressor provided in the ice-making drum to make ice might be variable according to the amount of the water stored in the water tank or conditions near the water tank.

Meanwhile, the conventional fixed ice-making drum type powdered ice maker has another disadvantage that the water not frozen from the water sprayed by the water spray part might fall to an ice tray configured to receive the cut ice only to melt the ice or make an ice lump and a further disadvantage that the water fails to be sprayed to an inner wall of the ice-making drum uniformly or the water sprayed to a lower region of the inner wall might flow downwards after failing to be made into ice.

DETAILED DESCRIPTION OF THE INVENTION

Technical Problem

To overcome the disadvantages, an object of the present invention is to address the above-noted and other problems and to provide a powdered ice maker or shaved ice generating device which may prevent not-frozen water from melting the shaved ice by preventing the not-frozen water from falling to the shaved ice.

Another object of the present disclosure is to provide a powdered ice maker or shaved ice generating device which may spray water to an inner wall of an ice-making part uniformly.

A further object of the present disclosure is to provide a powdered ice maker or shaved ice generating device which may reduce the amount of the not-frozen water falling from the ice-making part.

Technical Solution

To achieve these objects and other advantages and in accordance with the purpose of the embodiments, as embodied and broadly described herein, a shaved ice generating device comprises an ice-making part provided in a cylinder shape; a water spray part provided in the shaft and configured to spray water to an inner wall of the ice-making part, while rotating; a cutter part provided in the shaft and configured to cut the ice made on the inner wall of the ice-making part, while rotating; and a water tray provided under the water spray part and an ice tray provided under the cutter part, the water tray and the ice tray which are rotatable at the same angular speed with the shaft.

The ice-making part may be fixed, not rotatable.

The ice-making part may comprise a metal cylinder portion; and an ice-making refrigerant pipe configured to cover an outer circumferential surface of the cylinder portion.

The refrigerant flowing through the ice-making refrigerant pipe may lead in a lower region of the cylinder portion and lead out from an upper region of the cylinder portion.

The shaved ice generating device may further comprise a drive unit provided on the shaft and configured to rotate the shaft.

The water may be sprayed from the water spray part at a position higher than a half of the height of the ice-making part.

The shaved ice generating device may further comprise a path guide provided in the shaft and configured to disperse the sprayed water to all areas of the inner wall of the ice-making part uniformly, while rotating.

The path guide may comprise a bent portion which is provided in an end of the path guide and bent in the reverse direction of the rotational direction.

The water tray and the ice tray may be rotated while fixed to the shaft.

The water tray may have an open top and a preset depth so as to store the not-frozen water falling from the ice-making part.

The water tray may comprise a drainage path provided to drain the stored not-frozen water and the drained not-frozen water exchanges heat with the water supplied to the water spray part.

The ice tray may comprise an ice piling portion in which the falling shaved ice piles up; and an ice falling prevention rib upwardly projected from an arc of the ice piling portion.

The shaved ice generating device may further comprise an ice guide rib provided to discharge the shaved ice pilling up in the ice tray and passing the inside of the ice tray.

The ice guide rib may be fixed to a lower region of the ice-making part.

The water tray may be arranged lower than the ice tray.

Advantageous Effects

Accordingly, the embodiments have following advantageous effects. According to at least one embodiment of the present disclosure, the powdered ice maker or a shaved ice generating device is capable of preventing not-frozen water from melting the shaved ice by preventing the not-frozen water from falling to the shaved ice.

Furthermore, the powdered ice maker or shaved ice generating device is capable of spraying water to an inner wall of an ice-making part uniformly.

Still further, the powdered ice maker or shaved ice generating device is capable of reducing the amount of the not-frozen water falling from the ice-making part.

DESCRIPTION OF SPECIFIC EMBODIMENTS

Referring to the accompanying drawings, exemplary embodiments of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

The terminology used in the present disclosure is used only to describe specific embodiments, not intended to limit the present disclosure.

Figure 1:
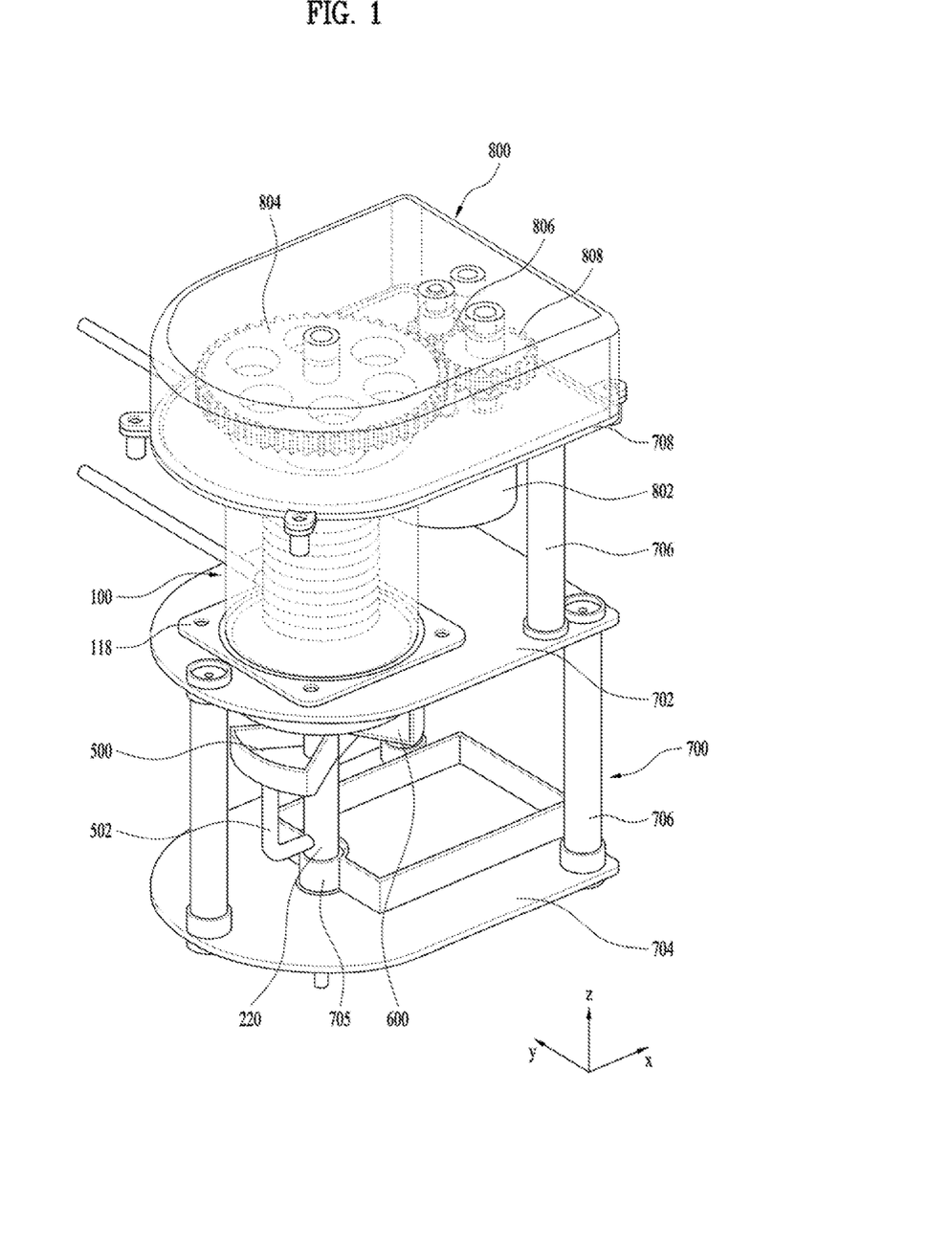
FIG. 1 is a perspective diagram of a shaved ice generating device in accordance with one embodiment of the present disclosure.

Referring to the orthogonal coordinates system shown in FIG. 1, a positive direction of X-axis is defined as a front direction (or forward) and a negative direction X-axis as a rear direction (or rearward). Also, a positive direction of Z-axis is defined as an upper direction (or upward) and a negative direction of Z-axis as a lower direction (or downward). A positive direction of Y-axis is defined as a right direction (or rightward) and a negative direction of Y-axis as a left direction (or leftward).

Figure 2:
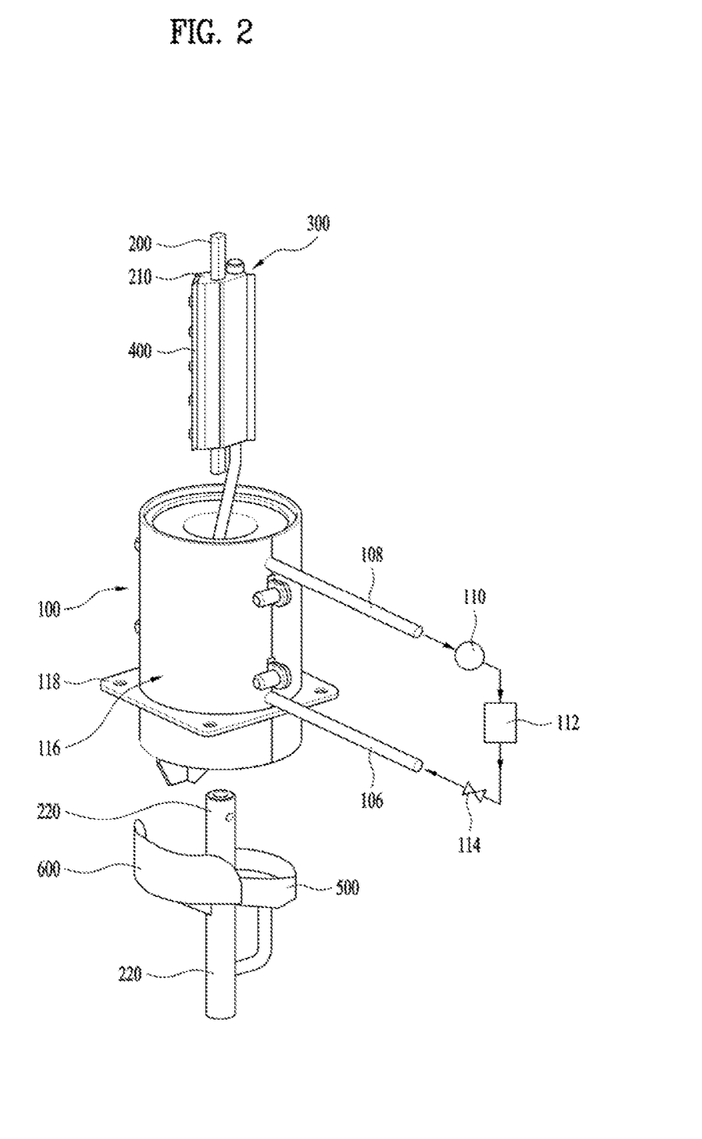
FIG. 2 is an exploded perspective diagram of the shaved ice generating device.

FIG. 1 is a perspective diagram of a shaved ice generating device in accordance with one embodiment of the present disclosure. FIG. 2 is an exploded perspective diagram of the shaved ice generating device.

As shown in FIGS. 1 and 2, the shaved ice generating device in accordance with the embodiment includes an ice-making part 100 formed in a cylinder shape; a shaft 200 which is rotary at a center axis of the ice-making part 100; a water spray part 300 provided in the shaft 200 and configured to spray water to an inner wall of the ice-making part 100 while rotating; a cutter part 400 provided in the shaft 200 and configured to cut the ice made on the inner wall of the ice-making part 100 while rotating; a water tray 500 provided under the water spray part 300 while rotating at the same angle with the shaft 200; and an ice tray 600 provided under the cutter part 400.

The shaved ice generating device is the fixed ice-making drum type. While the water spray part 300 and the cutter part 400 make powdered or shaved ice while they are rotating in the ice-making part 100. The water which fails to be made into ice may fall into the water tray 500 and be stored therein. The powdered or shaved ice cut from the inner wall of the ice-making part 100 may fall into the ice tray 600 and be stored therein. Accordingly, the shaved ice (SI) and the not-frozen-water are separated from each other so as not to cause the problem of the not-front-water melting the shaved ice (Si).

The shaved ice generating device in accordance with the illustrated embodiment may be manufactured as one module. The shaved ice generating module may be provided in an electric appliance such as a refrigerator, a water purifier or the like and make the shaved ice. Alternatively, the shaved ice generating module may be provided as an independent electric appliance to form one shaved ice generating device and make the shaved ice.

Hereinafter, the structure and elements of the shaved generating device will be described in detail.

Figure 3:
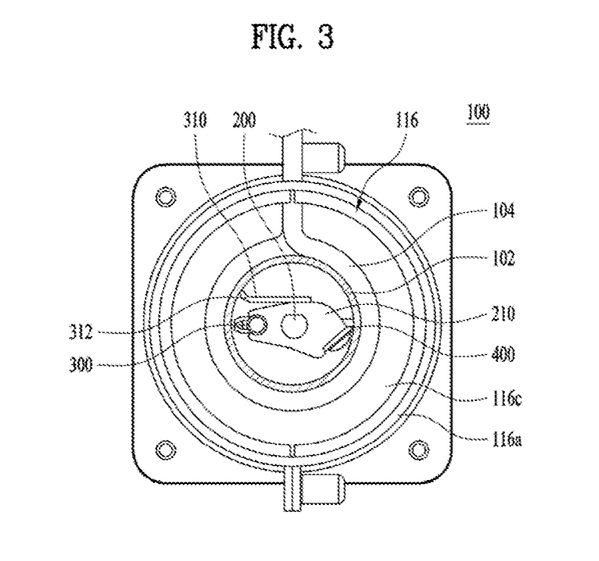
FIG. 3 is a sectional diagram horizontally illustrating the shaved ice generating device.
Figure 4:
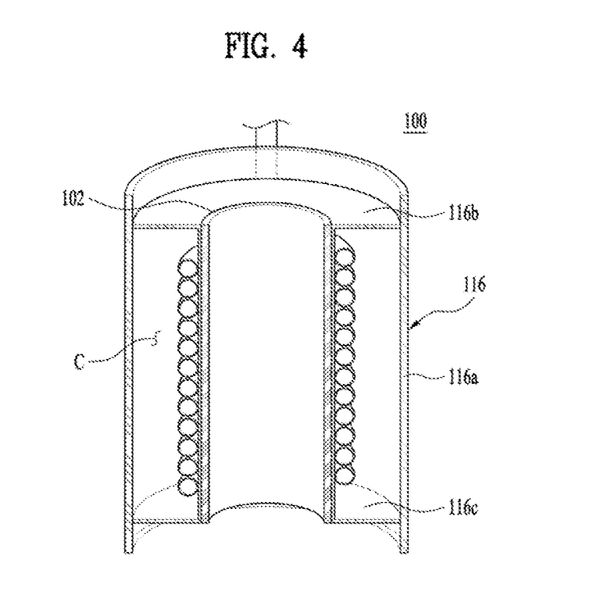
FIG. 4 is a sectional diagram vertically illustrating the shaved ice generating device.

FIG. 3 is a sectional diagram horizontally illustrating the shaved ice generating device and FIG. 4 is a sectional diagram vertically illustrating the shaved ice generating device.

Referring to FIGS. 3 and 4, the ice-making part 100 includes a metal cylinder portion 102; and an ice-making refrigerant pipe 104 covering an outer circumferential surface of the cylinder portion 102.

The cylinder portion 102 may be formed of the metal which has a high heat conductivity 102 to exchange heat with the ice-making refrigerant pipe 104 chilled to a low temperature in a relatively short time. A central axis of the cylinder portion 102 is vertically provided and the top and bottom of the cylinder portion 102 are open.

An inner circumferential surface of the cylinder portion 102 may directly receive the water sprayed by the water spray part 300 and the ice made on the inner circumferential surface of the cylinder portion 102 may be cut by the cutter part 400 to be the shaved ice (SI). In other words, the inner circumferential surface of the cylinder portion 102 may form an inner wall of the ice-making part 100.

The ice-making refrigerant pipe 104 may be wound around the outer circumferential surface of the cylinder portion 102 in a diagonal direction to form a helical shape.

The refrigerant flowing through the ice-making refrigerant pipe 104 is lead in a lower region of the cylinder portion 102 and lead out from an upper region of the cylinder portion 102. An inlet end 106 of the ice-making refrigerant pipe 104 may be provided in the lower region of the cylinder portion 102 and an outlet end 108 of the ice-making refrigerant pipe 104 may be provided in the upper region of the cylinder portion 102.

When a refrigeration capacity of the refrigeration cycle (e.g., the capacity of the compressor 110) is insufficient, the temperature of the refrigerant is relatively higher at the outlet end 108 than the inlet end 106. Accordingly, the lower region of the cylinder portion 102 is provided relatively lower at the temperature than the upper region.

Even when the water sprayed by the water spray part 300 falls along the inner circumferential surface of the cylinder portion 102, ice may be made in the lower region of the cylinder portion 102 of which the temperature is relatively lower than that of the upper region, only to minimize the not-frozen water falling from the cylinder portion 102.

The ice-making refrigerant pipe 104 may function as an evaporator for chilling the cylinder portion 102 and the water sprayed to the inner circumferential surface of the cylinder portion 102. The system of the refrigerator cycle includes an evaporator 104, a compressor 110, a condenser 112 and an expansion valve 114.

The high-temperature-and-high-pressure gas refrigerant compressed in the compressor 110 is circulated into the condenser 112 and condensed to be liquefied into a relatively low-temperature liquid refrigerant. The liquid refrigerant is circulated into the expansion valve 114 and expanded. The expanded low-temperature-and-low-pressure liquid refrigerant is circulated from the expansion valve 114 into the evaporator 104 and vaporized in the evaporator 104 to be gasified. The gasified refrigerant is transmitted to the compressor 110. As the liquid refrigerant is vaporized and gasified in the evaporator 104, the perimeter heat of the evaporator 104 is removed so as to cause an effect of chilling the surroundings of the evaporator 104.

In this instance, the inlet end 106 is connected with the expansion valve 114 and the outlet end 108 of the ice-making refrigerant pipe 104 is connected with the compressor 110.

Meanwhile, the shaved ice generating device may further include a housing 116 configured to store the cold air generated in the ice-making refrigerant pipe 104 so as to minimize the heat exchange between external air and the ice-making refrigerant pipe 104.

The housing 116 may cover the outer circumferential surface of the cylinder portion 102 and define a closed space (C). The ice-making refrigerant pipe 104 is provided in the closed space (C). Accordingly, the leakage of the cold air generated in the ice-making refrigerant pipe 104 or the heat exchange between the ice-making refrigerant pipe 104 and the external air may be minimized.

The housing 116 includes a housing cylinder portion 116a of which a diameter is larger than the diameter of the cylinder portion 102; a cover 116b and 116c configured to cover the space formed between the housing cylinder portion 116a and the cylinder portion 102. In this instance, the cover 116b and 116c includes an upper cover 116b and a lower cover 116c which are provided to cover the tops and bottoms of the housing cylinder portion 116a and the cylinder portion 102, respectively. Accordingly, the closed space (C) may be defined by the cylinder portion 102, the housing cylinder portion 116a, the upper cover 116b and the lower cover 116c.

The ice-making refrigerant pipe 104 refers to the piping area provided in the closed space (C). The inlet end 106 and the outlet end 108 of the ice-making refrigerant pipe 104 refer to the piping area provided outside the housing 116. In other words, the inlet end 106 penetrates a lower region of the housing 116 and the outlet end of the ice-making refrigerant pipe 104 penetrates an upper region of the housing 116.

Meanwhile, the shaved ice generating device may further include a fixing part 700 for fixing the housing 116 or the ice-making part 100. Hereinafter, the fixing part 700 for fixing the housing 116 is described for easy explanation and that may be also applicable for fixing the ice-making part 100.

The fixing part 700 includes a fixing plate 702 provided to fix the housing 116; and a bottom plate 704 provided under the fixing plate 702, spaced a preset distance apart therefrom.

The housing 116 is supported to an upper surface of the fixing plate 702 by a flange which is projected from an outer circumferential surface of the housing 116 via the fixing plate 702. The flange 118 and the fixing plate 702 are fastened by using a screw so as to fix the housing 116 to the fixing plate 702.

A plurality of supports may be provided between the fixing plate 702 and the bottom plate 704 and both ends of each support 706 may be secured to the fixing plate 702 and the bottom plate 704.

Meanwhile, the shaved ice generating device may further include a drive unit 800 configured to generate a driving force so as to rotate the shaft 200.

The drive unit 800 may be provided in an upper or lower region of the shaft 200. As the water tray 500 and the ice tray 600 are provided under the shaft 200, it is preferred that the drive unit 800 may be provided above the shaft 200.

The drive unit 800 includes a drive motor 802 that is configured to receive an electric power and generate a rotational force; a drive gear 806 connected with the drive motor 802; and a shaft gear 804 fixed to the shaft 200. The shaft gear 804 engages with the drive gear 806 and receives the rotational force configured to rotate the shaft 200. Alternatively, the shaft gear 804 may further include an auxiliary transfer gear 808 provided between the shaft gear 804 and the drive gear 806 so as to receive the rotational force and rotate the shaft 200 by using the rotational force. In this instance, the shaft gear 804, the transfer gear 808 and the drive gear 806 have diameters which are smaller in order.

When the drive unit 800 is provided above the shaft 200, an upper plate 708 may be further provided to fix the drive unit 800.

The upper plate 708 is upwardly spaced a preset distance apart from the fixing plate 702 and the plurality of the supports 706 may be provided between the fixing plate 702 and the upper plate 708 to support the upper plate 708. The upper region of the housing 116 penetrates the upper plate 708 and the shaft 200 rotatable on the center axis of the housing 116 (or the ice-making part 100) may be upwardly projected from an upper surface of the fixing plate 702, to be connected with the shaft gear 804.

Figure 5:
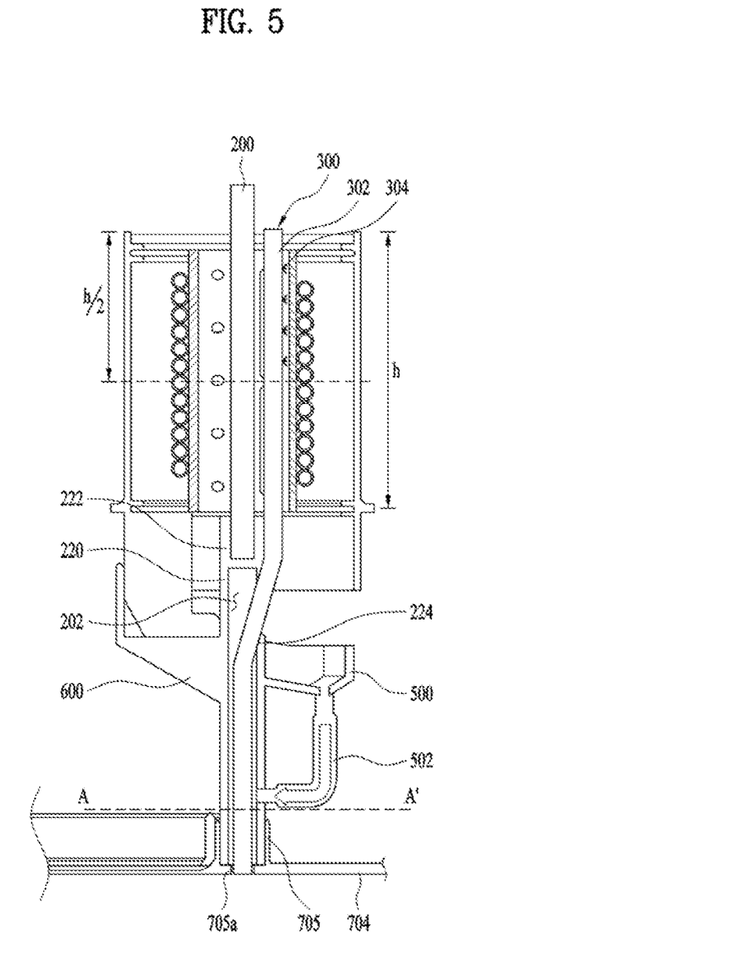
FIG. 5 is a sectional diagram illustrating a first state of the shaved ice generating device.
Figure 6:
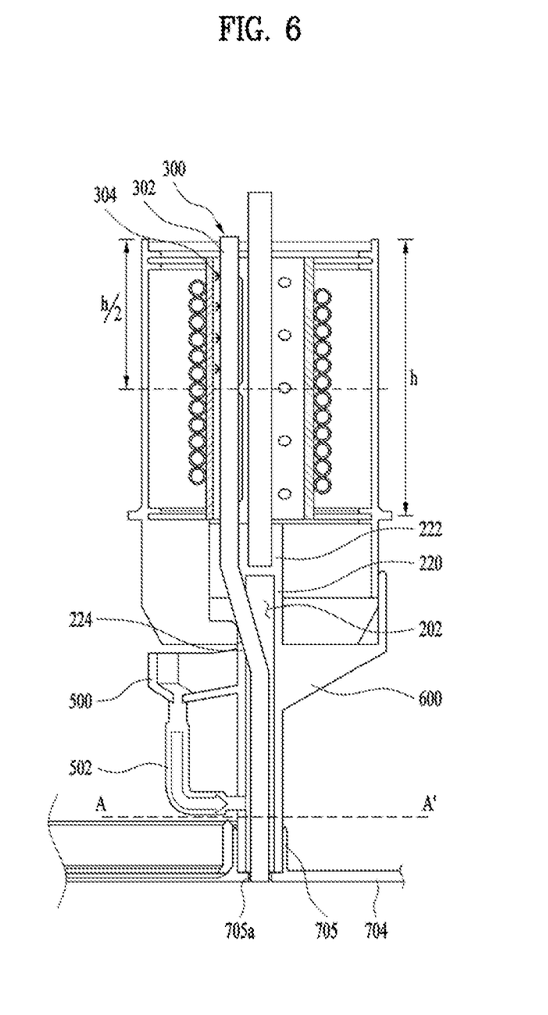
FIG. 6 is a sectional diagram illustrating a second state of the shaved ice generating device.

FIG. 5 is a sectional diagram illustrating a first state of the shaved ice generating device and FIG. 6 is a sectional diagram illustrating a second state of the shaved ice generating device.

With respect to a water spray direction in the first state of the shaved ice generating device, a water spray direction in the second state is rotated 180 degrees from the first state. In other words, the difference between the first and second states is the reversed state where the shaft is rotated 180 degrees right or left.

Referring to FIGS. 5 and 6, the water spray part 300 may include a tube 302 fixed to one side of the shaft 200 and configured to supply water; and a through-hole 304 configured to spray the water flowing along the tube 302 outside.

The tube 302 may be inserted via the hollow 202 provided in the shaft 200. The tube 302 provided in the hollow 202 may be connected with a side of a fitting (not shown) and a water supply hose (not shown) connected with an external water supply source is connected with the other side of the fitting (not shown). Accordingly, even when the tub 302 fixed to the shaft 200 is rotated, the tube 302 may be supplied water from the external water supply source, without being twisted by the fitting.

The through-hole 304 provided as the hole penetrating the tube 302 may adjust the diameter of the through-hole or the number of the through-holes 304 based on the amount or pressure of the water sprayed to the inner circumferential surface of the cylinder portion 102. An auxiliary nozzle (not shown) may be provided in the through-hole 304. However, the diameter of the tube 302 and the sprayed water might not be so large such that it is preferred that the nozzle (not shown) is provided if the diameter of the cylinder portion 102 becomes larger to make massive shaved ice.

The water may be sprayed from the water spray part 300 from a region which is higher than a half of the height (h) of the ice-making part 100. In other words, the water is sprayed downwardly from the region which is higher than the half of the height (h) of the cylinder portion 102. The through-hole 304 or the nozzle (not shown) may be provided higher than a half of the tube 302 provided in the cylinder portion 102.

It is more likely that the water sprayed to the upper region of the cylinder portion 102 is condensed to become ice while falling along the inner circumferential surface of the cylinder portion 102. However, the water sprayed to the lower region of the cylinder portion 102 is falling along the inner circumferential surface for a relatively short time period and the heat exchange with the ice-making part 100 may be then relatively short. It is more likely that the not-sprayed water becomes the not-frozen water to fall down from the ice-making part 100.

The water spray part 300 may be provided in a longitudinal direction of the shaft 200 and configured to spray water to the inner circumferential surface of the ice-making part 100. The water spray part 300 may vertically spray toward the inner circumferential surface.

Meanwhile, the shaved ice generating device may further include a path guide 310 configured to guide and spread the sprayed water on the inner circumferential surface of the ice-making part 100 uniformly.

The path guide 310 is fixed to the shaft 200 and rotatable together with the shaft. The path guide 310 is provided in the longitudinal direction of the shaft and an end of the path guide 310 is in contact with the inner wall of the ice-making part 100 such that the path guide 310 may rotate along the rotation of the shaft 200 while seems to sweep the inner wall.

The path guide 310 has to sweep the sprayed water to spread it uniformly, in contact with the inner wall of the ice-making part 100, after the water is sprayed to the inner wall of the ice-making part 100. In other words, the path guide 310 is provided in the reverse direction of the water spray direction (the rotational direction of the shaft).

The end of the path guide 310 may include a bent portion 312 which is bent in the reverse direction of the rotating shaft 200 so as to rotate the path guide 310 which is in contact with the inner wall of the ice-making part 100 smoothly.

Meanwhile, the cutter part 400 is fixed to the shaft 200 and configured to cut the ice made on the inner wall of the ice-making part 100 while rotating.

The cutter part 400 may be provided in the shaft, while it is provided in opposite to the water spray part 300. The cutter part 400 may include cutter blades which are arranged in the ice-making part 100 at preset intervals; and a cutter blade fixing portion provided to fix the cutter blades to the shaft.

The shaved ice generating device in accordance with the illustrated embodiment may further include a strength reinforcing support member 210 which is rotatable in the ice-making part 100 and which is penetrated by the shaft 200 (see FIG. 2).

The shaft 200 has one end which is vertically cut with respect to the longitudinal direction so that a cross section area may have a circular shape of which one side is cut away. Such the shaft 200 may penetrate the strength reinforcing support member 210 and rotate together with the shaft 200, without idling with respect to the shaft 200.

The strength reinforcing support member 210 may be provided only in the ice-making part 100 and the tube 302 of the water spray part 300 may be fixed to the strength reinforcing support member 210. Alternatively, the cutter part 400 or the path guide 310 may be fixed to the strength reinforcing support member 210. Accordingly, the strength reinforcing support member 210 may be provided as an independent member from the shaft 200 such that the assembling process thereof can be simplified and the strength of the shaft can be reinforced.

Meanwhile, the water spray 500 and the ice tray 600 may be rotatable while fixed to the shaft 200.

Alternatively, as shown in FIGS. 5 and 6, the shaved ice generating device may further include a hollow shaft 220 connected with a lower end of the shaft 200 and both of the ice tray 600 and the water tray 500 and configured to rotate together with the shaft 200.

An inserting portion 222 is provided in an upper end of the hollow shaft 220 to fixedly insert the shaft therein. The one end of the shaft 200 is vertically cut away and the cross section area of the shaft 200 is not a complete circle such that the shaft 200 inserted in the inserting portion 222 may transfer the rotational force to the hollow shaft 220, without idling.

The hollow shaft 220 may include a hollow 202 provided inside; and a tube penetrating hole 224 provided in the hollow 202. The tube 302 may be provided in the hollow 202 and penetrate the tube penetrating hole 224 to be fixed to the shaft 220 inserted in the upper portion of the hollow shaft 220 or the strength reinforcing support member 210. The water supplied via the tube 302 may be sprayed to the inner wall of the ice-making part 100 via the through-hole 304.

The lower portion of the hollow shaft 220 is inserted in a rotation support member 705 provided as a cylinder with an open top and the rotation support member 705 may be configured to support the rotation of the hollow shaft 220. The rotation support member 705 may include a water supply hole 705a which is communicable with the hollow 202 provided in the hollow shaft 220. The tube 302 is supplied water via the water supply hole 705a from outside.

The rotation support member 705 is provided in the bottom plate 705 and the water supply hole 705a is provided through the bottom plate 704 located in an inner region of the rotation support member 705.

The rotation support member 705 may include the fitting (not shown). One side of the fitting (not shown) is connected with the tube 302 and the other side of the fitting (not shown) is connected with a water supply path (not shown) connected with the external water supply source such that the tube 302 may not be twisted even when the hollow shaft 220 is rotated.

Figure 7:
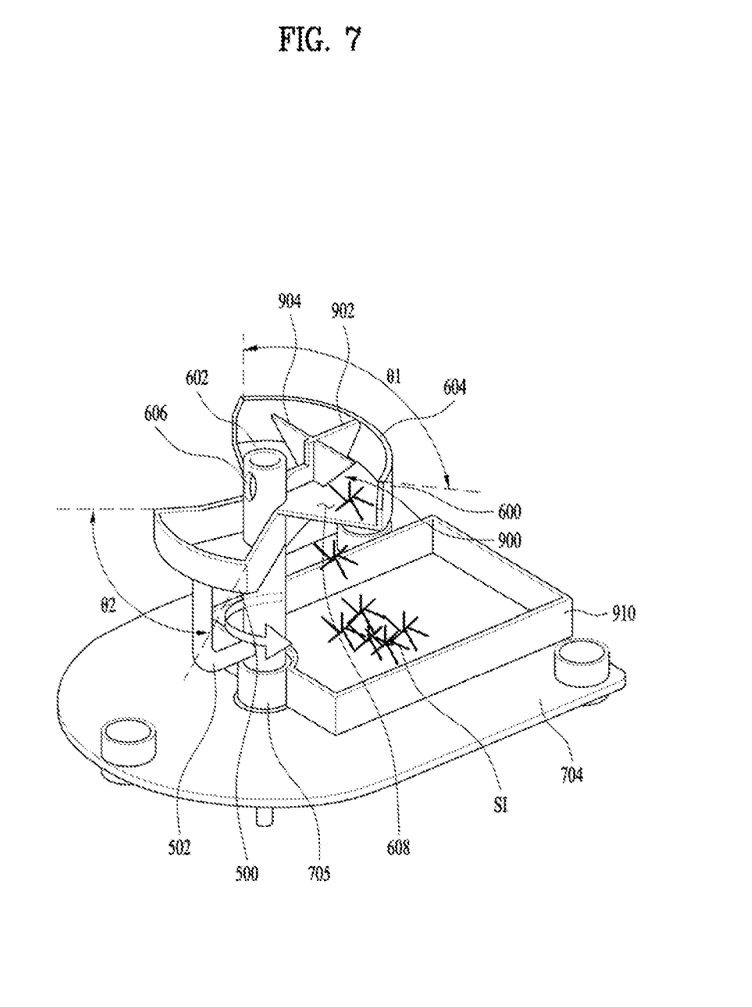
FIG. 7 is a perspective diagram partially illustrating the shaved ice generating device.
Figure 8:
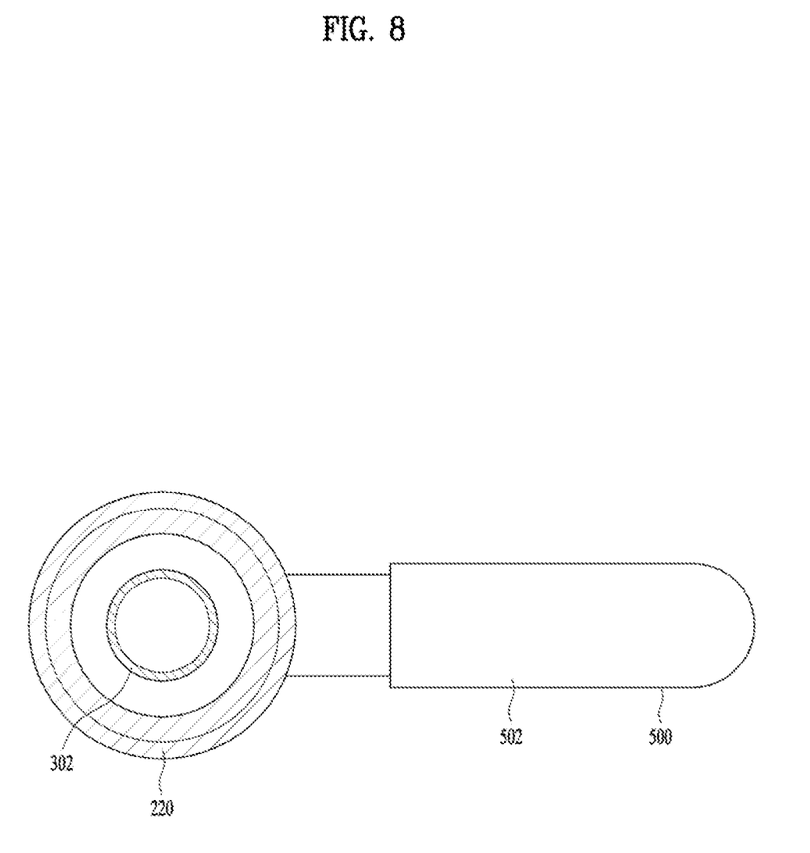
FIG. 8 is a horizontal sectional diagram of FIG. 5, viewed from bottom.

FIG. 7 is a perspective diagram partially illustrating the shaved ice generating device. FIG. 8 is a horizontal sectional diagram of FIG. 5, viewed from bottom.

Referring to FIGS. 7 and 8, the structure configured to separate the not-frozen water and the shaved ice from each other will be described.

The water tray 500 has an open top to store the not-frozen water falling from the ice-making part 100 and a predetermined depth.

Meanwhile, the water tray 500 may include a drainage path 502 configured to drain the stored not-frozen water. The drainage path 502 may be connected with a bottom of the water tray 500 to drain the not-frozen water outside. The drainage path 502 may be connected with the hollow 202 provided in the hollow shaft 220 to communicate and supply the low temperature not-frozen water to the hollow 202 so lower the temperature of the water inside the tube 302 by the heat exchange with the water supplied via the tube 302. Accordingly, the amount of the not-frozen water falling from the ice-making part 100 may be reduced and the wasted energy may be saved.

Meanwhile, the ice tray 600 may include an ice piling portion 602 to pile the shaved ice (SI) falling from the ice-making part 100; and an ice falling prevention rib 604 provided in the ice piling portion 602 to prevent the shaved ice from falling from the ice piling portion 602.

The ice piling portion 602 is provided in a lower portion under the cutter part 400 as one surface which is horizontally projected from the hollow shaft 220 such that the shaved ice cut from the inner wall of the ice-making part 100 by the cutter part 400 may pile up in the ice piling portion 602. The ice piling portion 602 may be provided in a fan shape a first center angle (θ1) of the ice piling portion 602 may be within 180 degrees not to contact with the not-frozen water falling from the ice-making part 100.

The ice falling prevention rib 604 is upwardly projected from an arc of the ice piling portion 602. In other words, the ice falling prevention rib 604 may be a rib which is upwardly projected from a point of a radius spaced a preset distance apart from the center of the ice piling portion 602, considering the polar coordinates system.

In some examples, the ice tray 600 has two open sides corresponding to the radius of the ice piling portion 602, except the arc of the ice piling portion 602. In other words, the ice tray 600 includes a first discharging hole 606 and a second discharging hole which are open in an angular direction to discharge the shaved ice (SI) piling in the ice tray 600 with respect to the polar coordinates system.

Meanwhile, the shaved ice generating device in accordance with the illustrated embodiment may further include an ice guide rib 900 configured to discharge the shaved ice (SI) piling in the ice tray 600.

The ice guide rib 900 is fixed to a lower region of the ice-making part 100 and configured to move along the inside of the rotating ice tray 600 relatively. More specifically, the shaved ice falling after cut in the cutter part 400 may pile up on the upper surface of the ice piling portion 602 while the ice tray 600 is performing one rotation with respect to the shaft. The ice guide rib 900 may move into the ice tray 600 after passing through the first discharging hole 606 which is formed in an open side of the ice tray 600 and then push the shaved ice (SI) to discharge the shaved ice through the second discharging hole 608 and fall outside the ice tray 600.

Alternatively, the ice guide rib 900 may be fixed to a lower region of the housing 116 by using an auxiliary member. In other words, it is possible to fix the ice guide rib 900 to any positions which only facilitate the relative motion with the rotating ice tray 600.

The ice guide rib 900 may include a first rib 902 provided in a radial direction with respect to the shaft 200; and a second rib 904 vertically provided with respect to the first rib 902. The first rib 902 has the length which is corresponding to the radius of the ice piling portion 602 to sweep and pass all of the upper surface area of the ice piling portion 602. The second rib 904 is projected from the first rib 902 in a vertical direction to have a preset length so as to prevent the damage to the first rib 902 which might be caused by a large torque applied to the first rib 902 by the shaved ice collected only in the end of the first rib 902.

The water tray 500 may be installed under the ice tray 600 not to be placed in a rotational radius of the ice guide rib 900.

Alternatively, the water tray 500 may have a fan shape and a second center angle (θ2) of the water tray 500 may be smaller than the first center angle (θ1) of the ice tray 600. That is because it is not necessary to store the not-frozen water in the water tray 500 as the drainage path 502 is connected with the water tray 500.

The shaved ice generating device may further include an ice storage 910 provided under the ice guide rib 900.

The ice storage 910 has an open top and a preset depth so as to store the shaved ice (SI) falling from the ice tray 600. Accordingly, the user can use the shaved ice (SI) stored in the ice storage 910.

The ice storage 910 may be provided in a top surface of the bottom plate 704 and detachable so as to enhance user convenience.

Figure 9A:
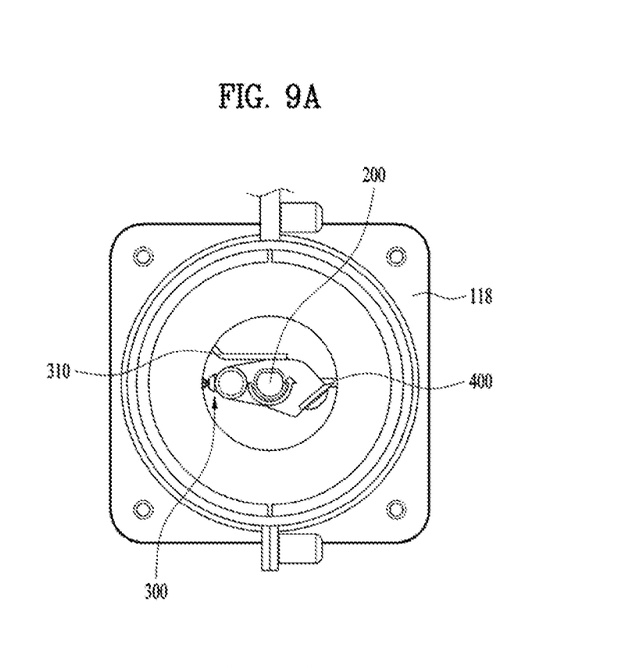
FIGS. 9a and 9b are diagrams illustrating a state where the water sprayed is made into ice in the shaved ice generating device.
Figure 9B:
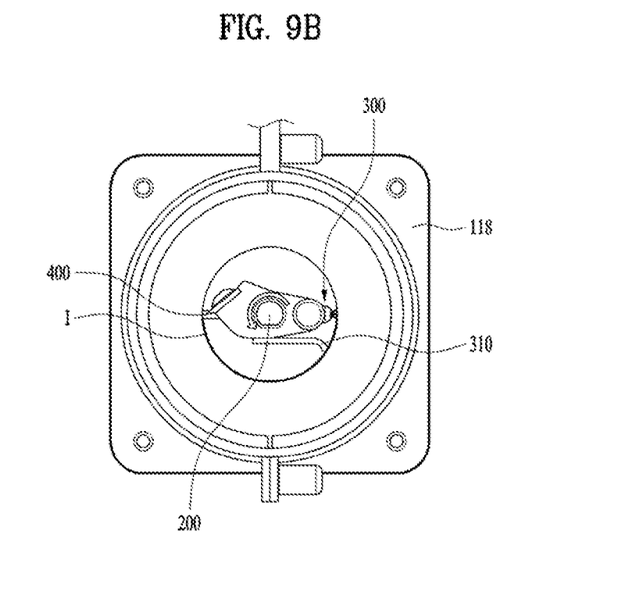
Figure 10A:
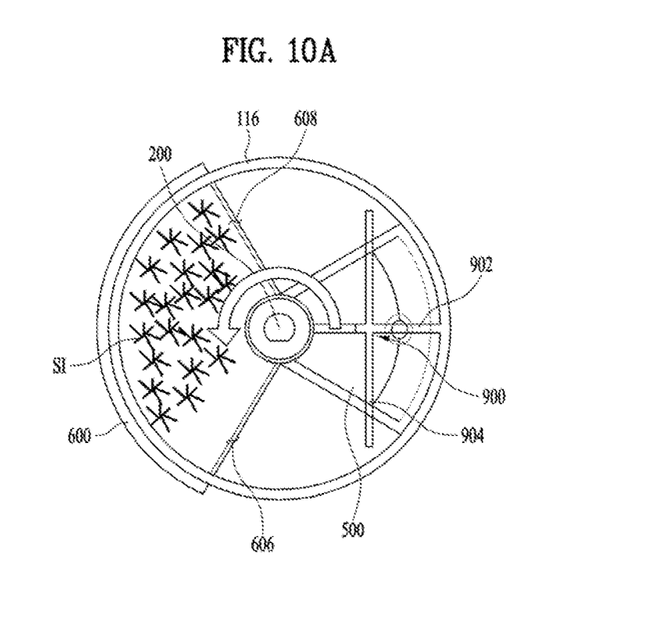
FIGS. 10a, 10b, and 10c are diagrams illustrating a state where shaved ice is exhausted from an ice tray in the shaved ice generating device.
Figure 10B:
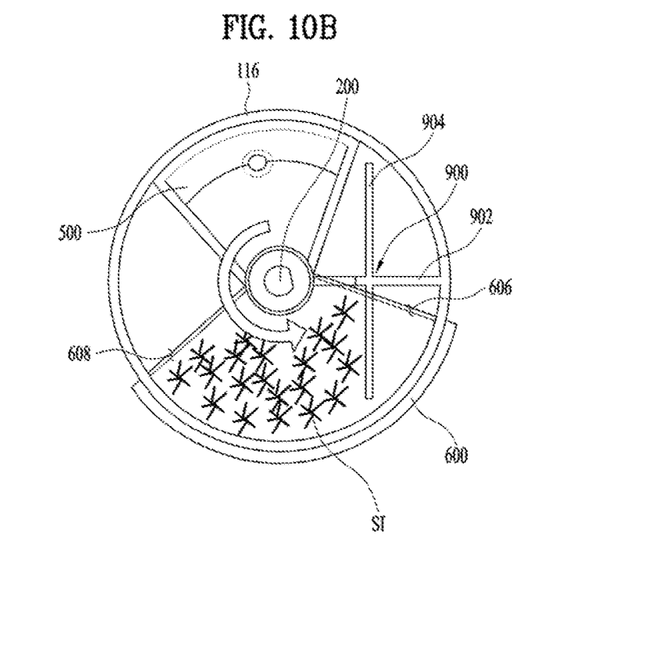
Figure 10C:
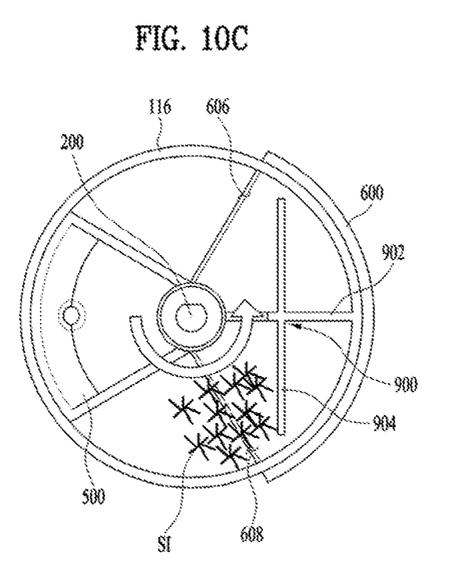

FIG. 9 is a diagram illustrating a state where the water sprayed is made into ice in the shaved ice generating device and FIG. 10 is a diagram illustrating a state where shaved ice is exhausted from an ice tray in the shaved ice generating device.

Referring to FIGS. 9 and 10, the operation of the shaved ice generating device will be described.

Referring to FIG. 9a, a signal requesting to make the shaved ice is input by a user's request or preset program and the ice-making part 100 is chilled by the refrigeration cycle system. Hence, the shaft 200 is rotating in a counter-clockwise direction and the water spray part 300 sprays water to the inner wall of the ice-making part 100. As shown in FIG. 9b, the sprayed water is uniformly distributed to the inner wall of the ice-making part 100 by the path guide 310 and the chilled ice-making part 100 makes ice (I). When the shaft 200 is rotated 180 degrees, the cutter part 400 cuts the ice (I) made on the inner wall of the ice-making part 100 to make shaved-ice (SI). The made shaved ice (SI) falls and piles up in the ice tray 600.

The water spray part 300 and the cutter part 400 forms 180 degrees such that water may not be directly sprayed to the inner wall of the ice-making part 100 from which the ice is cut by the cutter part 400 and that there may be time for chilling water by using the refrigeration cycle system until water is sprayed again by the water spray part 300 located in the opposite. Accordingly, it may be minimized that the water sprayed to the ice-making part 100 fails to be frozen to become the not-frozen water.

As shown in FIG. 10a, the shaved ice (SI) cut by the cutter part 400 and falling may pile up in the ice tray 600. As shown in FIG. 10b, the ice tray 600 rotating in the counter-clockwise direction together with the shaft 200 or the hollow shaft 220 may meet the fixed ice guide rib 900 and the ice guide rib 900 may pass the inside of the ice tray 600. The ice guide rib 900 may push the shaved ice (SI) from the ice tray 600 and discharge the shaved ice outside. The discharged shaved ice (SI) may be stored in the ice storage 910 and used if necessary. FIG. 10c is a diagram illustrating a state after FIG. 10b.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITIES

The shaved ice generating device is capable of preventing the not-frozen water from falling to the cut shaved ice and preventing the cut shaved-ice from being melted by the not-frozen water.

What is claimed is:

1. A shaved ice generating device comprising:
an ice-maker having a cylinder shape;
a water spray provided at a shaft and configured to spray water to an inner wall of the ice-maker based on rotation of the water spray;
a cutter provided at the shaft and configured to cut ice made on the inner wall of the ice-maker based on rotation of the cutter; and
a water tray provided under the water spray, and an ice tray provided under the cutter,
wherein the water tray and the ice tray are configured to rotate at a same angular speed with the shaft.

2. The shaved ice generating device of claim 1, wherein the ice-maker is fixed and is configured not to rotate about the shaft.

3. The shaved ice generating device of claim 2, wherein the ice-maker comprises:
a metal cylinder portion; and
an ice-making refrigerant pipe that covers an outer circumferential surface of the metal cylinder portion and that is configured to guide refrigerant.

4. The shaved ice generating device of claim 3, wherein the ice-making refrigerant pipe is configured to guide the refrigerant from a lower region of the metal cylinder portion to an upper region of the metal cylinder portion.

5. The shaved ice generating device of claim 1, further comprising:
a drive motor or a drive gear connected to the shaft and configured to rotate the shaft.

6. The shaved ice generating device of claim 1, wherein the water spray is configured to spray water to a position higher than a half of a height of the ice-maker.

7. The shaved ice generating device of claim 1, further comprising:
a path guide provided at the shaft and configured to disperse the sprayed water to areas of the inner wall of the ice-maker based on rotation of the shaft.

8. The shaved ice generating device of claim 7, wherein the path guide comprises a bent portion that is provided at an end of the path guide and that is bent in a direction opposite to a rotational direction of the shaft.

9. The shaved ice generating device of claim 1, wherein the water tray and the ice tray are fixed to the shaft and configured to rotate with the shaft.

10. The shaved ice generating device of claim 9, wherein the water tray has an open top and a preset depth, and is configured to receive water falling from the ice-maker.

11. The shaved ice generating device of claim 10, wherein the water tray comprises a drainage path configured to drain the received water in the water tray to allow the drained water to exchange heat with the water supplied to the water spray.

12. The shaved ice generating device of claim 9, wherein the ice tray comprises:
an ice piling portion configured to receive shaved ice from the ice-maker; and
an ice falling prevention rib upwardly projected from an arc of the ice piling portion.

13. The shaved ice generating device of claim 12, further comprising:
an ice guide rib provided to discharge the shaved ice piling up in the ice tray, the ice guide rib passing an inside of the ice tray.

14. The shaved ice generating device of claim 13, wherein the ice guide rib is fixed to a lower region of the ice-maker.

15. The shaved ice generating device of claim 13, wherein the ice tray comprises an inlet hole which is penetrated by the ice guide rib.

16. The shaved ice generating device of claim 13, wherein the ice guide rib comprises a first rib provided in a radial direction with respect to the shaft.

17. The shaved ice generating device of claim 1, wherein the water tray is arranged lower than the ice tray.

18. The shaved ice generating device of claim 1, wherein the water tray and the ice tray are formed in a fan shape with respect to the shaft.

19. The shaved ice generating device of claim 18, wherein a first center angle of the ice tray is larger than a second center angle of the water tray.

20. The shaved ice generating device of claim 19, wherein the first center angle of the ice tray and the second center angle of the water tray are not overlapped with each other.

\* \* \* \* \*